March 24, 1970 M. G. BRILLE 3,501,913
TWO-STROKE GAS TURBINES
Filed Feb. 2, 1968
2 Sheets-Sheet 1
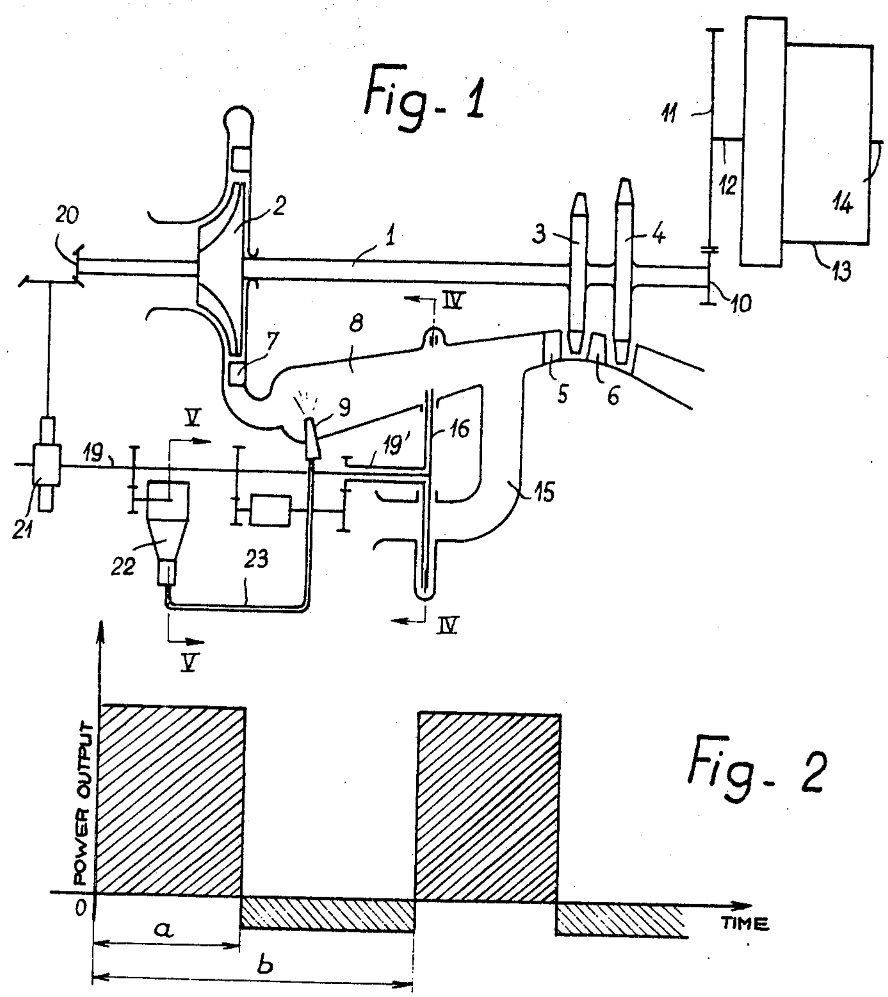
INVENTOR
MAURICE G. BRILLE
By Stevens, Davis, Miller & Mosher
ATTORNEYS

TWO-STROKE GAS TURBINES

Filed Feb. 2, 1968

INVENTOR
MAURICE G. BRILLE

By Stevens, Davis, Miller & Mosher
ATTORNEYS

United States Patent Office 3,501,913
Patented Mar. 24, 1970

1

3,501,913
TWO-STROKE GAS TURBINES

Maurice G. Brille, Billancourt, France, assignor to Regie Nationale des Usines Renault, Billancourt, France, and Automobiles Peugeot, Paris, France Filed Feb. 2, 1968, Ser. No. 702,744
Claims priority, application France, Feb. 17, 1967, 95,475
Int. Cl. F02c *5/12, 7/02*
U.S. Cl. 60—39.15 8 Claims

ABSTRACT OF THE DISCLOSURE

Gas turbine with combustion chamber and compressor, characterised in that means are provided for causing the intermittent operation of said combustion chamber and the delivery to said turbine of fresh cooling and scavenging air alternating with the flow of combustion gases delivered by said chamber.

The present invention relates to gas turbine of the combustion chamber and compressor type operating according to the two-cycle process.

The essential problem arising in the practical use of turbines as a power unit for propelling a vehicle lies in its efficiency, more particularly in comparison with diesel engines. The chief drawback of turbines from the point of view of efficiency, in comparison with piston engines, lies primarily in the fact that a turbine is exposed continuously to hot combustion gases and that the buckets, at least those of the first turbine wheel, operate substantially at this gas temperature.

In a conventional reciprocating combustion engine the pistons, as they perform several functions, assume a mean temperature between the maximum gas temperature, the temperature developing during the compression stroke, the temperature developing during the induction stroke, etc., so that with combustion gases produced at the normal temperature corresponding to the stoichiometric value, the piston temperature may remain of the order of 300° C. (572° C.); in contrast thereto, if this mixture were burnt in a turbine the combustion temperature would be transmitted integrally thereto and the turbine would rapidly suffer severe damages.

Therefore, it occurred that the obvious solution consisted in diluting considerably the normal mixture by using at least twice the air necessary for the combustion along or, in other words, providing a cooling system which from the point of view of power output or efficiency, is extremely costly.

This extra cooling is all the more costly as the inherent efficiencies of the turbine and compressor are lower and the rated power output of the turbine is reduced.

The search for reducing the magnitude of this dilution led to develop turbine components made of materials capable of operating at increasingly higher temperatures, but the cost of these materials rises constantly and consequently the turbine cost is heavily burdened by these increasingly expensive materials.

Attempts have also been made with a view to make the turbine temperature independent of the combustion gas temperature, by using various means without impairing the continuity of the gaseous flow utilized in the turbine.

It is the essential object of the present invention to obtain the same result by producing a discontinuous or intermittent flow, i.e., by periodically interrupting the gas flow to permit the scavenging of the turbine by means of a cooling-air flow.

This invention therefore provides a gas turbine operating according to the two-cycle process, i.e., an expansion

2 cycle involving a normal operation with balanced pressures, and a scavenging cycle.

An essential feature characterising this invention consists in utilizing during the expansion cycle a minimum air dilution corresponding to a stoichiometric mixture providing gases at a maximum temperature during a time period short enough to prevent the temperature of the input director blades and of the first stage of the turbine from exceeding the permissible value, and subsequently, during another cycle, cutting off completely the fuel feed and the air output from the compressor, while venting to the atmosphere the turbine distributor inlet.

During the expansion cycle the negative work done on the compressor is considerably less than otherwise since there is practically no excess air, and the necessary volume of air is substantially halved; under these conditions, the ratio of the thermal efficiency to the shaft efficiency is definitely improved. The purpose of the second-cycle arrangements (this cycle being no more a working cycle) is to produce a considerable turbine cooling action, the turbine becoming during this cycle its proper cooling fan with the minimum energy expenditure. Since on the other hand any output is cutoff in the compressor the power required for driving same remains low, although its efficiency is greatly impaired. Similarly, the turbine constitutes a fan of relatively poor efficiency but since it uses air at the atmospheric pressure the absolute value of the absorbed power is also remarkably low.

It may be observed that the poor efficiency of the compressor during the scavenging process is attended by a temperature increase in the combustion chamber; this temperature elevation is beneficial for the reignition of fuel during the next expansion or power cycle; however, the scavenging cycle must be short enough to prevent the temperature from raising above a value likely to impair the strength or other physical properties of the compressor components.

It may also be noted that the flow of cooling air directed through the turbine creates turbulences promoting the thorough cooling thereof.

Under these conditions it is clear that the use of a short cycle is advantageous for it leads to a relatively high frequency in order to avoid an excessive heating of the turbine during the first cycle and of the compressor during the second cycle.

The higher the ratio of the duration of the first cycle to that of the second cycle, the higher the shaft efficiency. As a result, the desired low loads and power variations can be obtained by altering the time ratio of these two cycles.

This invention is also remarkable in that it permits of obtaining low loads by varying said ratio while constantly preserving, during the expansion cycle, the maximum fuel output consumable by the air flowing through the compressor.

It will be seen that under these conditions even if speed varies during the first expansion cycle, the input and output speed triangles of the compressor and turbine are constantly adequate; of course, they will become incorrect during the second cycle but this applies only to low power figures, in absolute value.

In the foregoing it is stated that a high frequency and relatively short time periods are preferred, but in this direction one is limited by the necessity of reducing the magnitude of the change from one cycle to another, since this might create a certain disturbance. It is essential that the relative duration of these changes in the cycle remain low, with the consequence that frequency tends to be limited.

The present invention provides by way of example means for creating this two-cycle process and modifying the ratio of the two cycles involved. The succession of an expansion cycle and a scavenging cycle is a source of torque irregularity constituting the same problem as in a piston engine. After the conventional reduction gearing of the turbine it would be advisable to apply known methods for regularizing the torque, such as the use of a flywheel, or the combination of a plurality of properly phase-shifted turbines coupled to the same reduction gearing.

In the case of automotive propulsion this single-shaft turbine has a moderate flexibility but it can be combined with an infinitely variable-speed transmission mechanism (of the hydrostatic or electrical type).

However, a two-shaft turbine may also be designed from the same principle by separating the last turbine stage controlling alone the reduction gearing, the transmission mechanism and the vehicle.

Although the regenerator is less useful in the present case than with conventional turbines, it is also possible to combine it with the turbine operating according to the two-cycle process of this invention.

In any case a clearer understanding of this invention will be had from the following description made with reference to the accompanying drawings illustrating diagrammatically by way of example typical forms of embodiment of this invention. In the drawings:

FIGURE 1 is a comprehensive diagram showing a single-shaft turbine according to this invention;

FIGURE 2 is a diagram showing the power output plotted against time for the turbine assembly of FIGURE 1;

FIGURE 3 is a diagram illustrating the turbine bucket temperature variations;

Figures 4, 5, 6, 7:
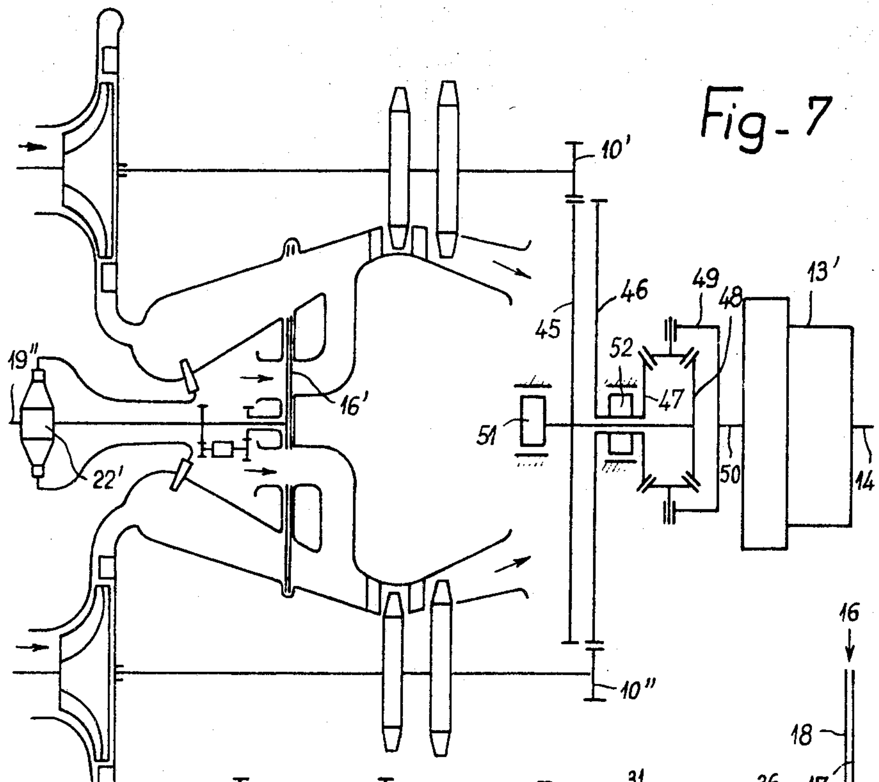
FIGURE 4 shows the distributor in section, the latter being taken along the line IV—IV of FIGURE 1.
FIGURE 5 is a cross-sectional view of the fuel pump, the section being taken along the line V—V of FIGURE 1.
FIGURE 6 illustrates details of the distributor and pump control mechanism.
FIGURE 7 illustrates a possible combination according to this invention of two associated turbines having a common distributor and operating in phase opposition.

Referring first to FIGURE 1 showing in diagrammatic form a turbine arrangement according to the present invention, the shaft 1 thereof carries the compressor rotor 2 and, for example, two turbine stages 3 and 4; in front of the first stage are guide vanes 5 and in front of the other stage 4 are other guide vanes 6. The compressor 2 as illustrated is a centrifugal compressor but an axial type may be used as well.

Similarly, although the drawings illustrate a two-stage turbine, the latter may also comprise three, four or more stages, if desired.

The assembly comprises a compressor diffuser 7, a combustion chamber 8 and a burner 9. The reduction gearing is disposed at the opposite end of shaft 1 and comprises gears 10 and 11; the torque is transmitted via the low-speed shaft 12 to any suitable infinitely variable speed transmission mechanism 13 (shown only in block form) the output shaft 14 of which drives the differential or other final transmission of the vehicle.

The first set of guide vanes 5 of the turbine receives the gases from the combustion chamber 8 together with external air filtered by adequate means and fed through a branch duct 15. The rotary distributor 16 is so designed that it permits the passage therethrough either of the flow from the combustion chamber (and in this case the branch duct 15 is blocked), or the flow of atmospheric air through this duct 15 (and in this case the combustion chamber 8 is blocked in turn).

This rotary distributor 16 may consist of a shutter-type assembly of concentric identical plates, as best shown in FIGURES 4 and 6. The complete distributor 16 consists of a rear plate 17 and a front plate 18; plate 17 is rotatably solid with shaft 19, constituting the distributor or timing shaft of the installation, which controls the cycle sequence. This shaft 19 is driven from the turbine shaft 1 through a high-ratio reduction gearing 20 and 21. Plate 18 on the other hand is rigid with a concentric shaft 19' also driven from shaft 19 as will be described presently.

The value of the general gear reduction thus obtained for driving the distributor 16 determines the cycle frequency, i.e., the ratio $1/b$ wherein $b$ is the cycle time in seconds (see FIGURE 2).

The shaft 19 also drives through suitable gears the fuel pump 22 delivering its output into a pipe line 23 leading to the fuel injection nozzle 9.

The relative timing of plates 17 and 18 of distributor 16 permits of varying the ratio of the two expansion and scavenging cycles, i.e. $a/b-a$.

These two plates have the same general circular configuration (see FIGURE 4); both comprise a projecting sector 24 adapted to seal the combustion chamber and between this sector and their hub portion they comprise an arcuate aperture 25 adapted to open the passage for performing the scavenging and cooling cycle.

When the two plates 17 and 18 are exactly superposed so that their arcuate apertures extend symmetrically in relation to the axis $xy$ of sector 24, the resulting sector has the minimum angular amplitude and the resulting aperture has the minimum angular amplitude; when they are shifted in relation to each other the resulting sector and arcuate aperture increase by the same angular amplitude, thus increasing the aforesaid ratio $a/b-a$.

This relative shifting of the distributor disks may be effected during the turbine operation. Considering FIGURE 6, it will be seen that the distributor shaft 19 carries a pnion 26 driving another pinion 27 rigid with a sun wheel 28 of a differential carried by another shaft 29 rigid with a planet carrier 30 rotatably supporting planet pinions 31; also rotatably mounted on shaft 29 and concentric thereto is another normally stationary sun wheel 32 adapted however to revolve under the control of a bevel gearing 33 and a toothed wheel 34.

The shaft 29 drives the plate 18 through a pair of toothed wheels 35, 36 and shaft 19 drives the other plate 17 directly. If the ratio between pinions 26 and 27 is 1:1, the ratio of pinions 35 and 36 must be 2:1.

It is clear that in this case if pinion 34 is held against rotation by means of the rack 37, the sun wheel 32 will remain stationary, the shaft of pinion 27 will revolve at the same speed as shaft 19 but in the opposite direction; shaft 29 will revolve in the same direction as pinion 27 but at half-speed, therefore in the direction opposite to that of shaft 19 and at half-speed. Under these conditions the shaft of toothed wheel 36 will revolve in the same direction and at the same speed as shaft 19. If rack 37 is moved to alter the angular position of pinion 34, the plate 18 will be shifted in relation to plate 17, both in the inoperative and operative conditions of the machine, and the desired result will be obtained.

Shaft 19 also drives, as already disclosed, the fuel injection pump 22. In FIGURE 5 the diagrammatical cross-sectional view of this pump shows more particularly the cam 38. If the direction of rotation is trigonometric, the leading or attack curve 39 of this cam is an Archimedean spiral between points $m$ and $n$; the trailing or return curve $n$–$m$ is immaterial, provided that it interconnects these points $n$ and $m$. The pump piston 40 is similar to that of diesel fuel injection pumps and comprises in the known fashion a fuel output adjustment device shown diagrammatically in the form of a helical edge 41 and a longituidnal groove 55 permitting of stopping the fuel output at any point along the stroke, therefore at any desired point along the cam contour 39, this piston being adapted to be oriented by a toothed quadrant 42 driven in turn by a toothed control rack 37.

It will be noted that this rack 37 controls by means of said toothed quadrant 42 both the injection time of pump 22 and the opening and closing times of distributor 16.

The general assembly described hereinabove operates as follows:

Assuming that the initial position of the rotary distributor 16 is that illustrated in FIGURE 1 (open combustion chamber):

The compressor 2 draws air at the atmospheric pressure and temperature and forces it under a pressure P into the combustion chamber 8; the fuel is atomized by the nozzle 9 under conditions (to be set forth presently) providing a high and substantially constant gas temperature $\theta$ (for example $\theta$=1,500° C.). At that time the disks of distributor 16 are so disposed that the middle point of sector 24 is diametrally opposed to the gas flow; therefore, this gas flow can take place freely towards the turbine. The gas thus strike the entire surface of guide vanes 5, i.e., under maximum feed conditions, before impinging against the buckets of the first turibne wheel 3, then the second set of guide vanes 6 and subsequently the buckets of the other turbine wheel 4, still under maximum flow conditions, before expanding and being eventually exhausted. The bucket temperature of wheel 3 is for instance $T<\theta$ (FIGURE 3) and rises constantly during the expansion cycle.

The fuel pump 22 is so timed that the spiral curve 39 of cam 38 drives the piston 40 at a constant speed proportional to that of shaft 19 and therefore of shaft 1. The fuel output is thus proportional to the air input which is slightly in excess but always in the same proportion, thus permitting the definition of the constant and high temperature $\theta$. Consequently, the ratio of the speed of the gases impinging against the first wheel 3 to that of the air entering the diffuser 7 is constant and higher than with the usual excess of air. In spite of the unavoidable heat losses to which these gases are subjected as they contact the colder turbine buckets (which on the other hand are designed accordingly) the ratio of the power output of the turbine to the energy absorbed by the compressor is considerably higher than in conventional turbine installations, so that the net output measured as the torque on pinion 10 in relation to the weight of air drawn into the apparatus or to the weight the fuel consumed is considerably higher than the usually observed ratio.

Even if the turbine speed varies slightly, the air/fuel speed ratio remains substantially constant, and the compressor and turbine speed triangles remain adequate.

Moreover, it may be noted that during this time the distributor 16 positively prevents any air flow through duct 15.

Upon completion of the power or expansion cycle the turbine bucket temperature has reached what may be considered as constituting the limit temperature T1 (still below $\theta$), the fuel inlet is blocked, the sector 24 of disk 16 closes the combustion chamber 8 and the orifice 25 registers with and opens the air duct 15. The compressor still driven at the same speed continues to compress air but without any output; therefore, the power demand thus falls to a relatively low value; the pressure P drops on the inlet-side of the guide vanes 5 of the turbine, and this turbine now operates as a cooling fan, drawing air from duct 15 and forcing same towards the exhaust; thus, the bucket temperature decreases from T1 to T5 (FIG. 3). At that time the second cycle is completed and the initial conditions described hereinabove are restored, the bucket temperature rising again from T5 to T'1=T1 at the end of another expansion cycle.

Under the above-described conditions the compressor may tend to operate as a pump, and therefore the duration of this second cycle must be short enough to prevent the compressor from beginning to vibrate.

During the second cycle no power is delivered, but power is absorbed as a consequence of the no-load operation of the compressor and turbine.

The above-description refers to the full-load operation of the machine. To obtain a reduced load the rack 37 is actuated for jointly reducing the effective fuel injection time and the first-cycle time *a* of the two-cycle process by shifting the disks 17 and 18 to each other, while increasing the angular amplitude of sector 24 and arcuate aperture 25 by means of the mechanism described in the first part of the above disclosure.

As a result, the positive work will be decreased and the negative work will be slightly increased since this negative work will always consist of the work demanded by the compressor and turbine operating under no-load conditions; therefore, the total efficiency will be slightly lower but in this respect it may be noted that the momentary power output measured at any moment during the time *a* will remain the same as that obtained under full-load conditions since the momentary efficiency conditions remain unchanged with the gas temperature $\theta$; the speed triangles of the turbine and compressor remain the same as those obtained under full-load conditions throughout the first cycle.

Most probably, in the final balance the total efficiency will be higher than if the fuel proportion were reduced as in conventional practice.

Considering again FIGURE 3 it will be seen that the turbine bucket temperature (first wheel 3) oscillates between T5 and T1. For the same combustion temperature $\theta$, if the cycle frequency is doubled, for a same average temperature T two extreme temperature values T2 and T4 nearer to each other, and therefore a temperature T2 lower than T1, are obtained; thus, the turbine operates under more favorable thermal conditions and heat surges are reduced considerably.

FIGURE 7 illustrates a twin-turbine arrangement operating according to the two-cycle process of this invention. Both turbines are operatively connected through their pinions 10' and 10" to the gear-reducing toothed wheels 45 and 46, respectively, each wheel 45 and 46 being rotatably rigid with a bevel sun gear, sun wheel 47 being connected to toothed wheel 46 and sun wheel 48 to toothed wheel 45.

The planet carrier 49 is rigid with shaft 50 and transmits the torque via a transmission mechanism 13' to the vehicle driving shaft 14.

The sun wheel 48 is rotatably solid with a freewheel device 51 and the other sun wheel 47 is rotatably solid with another freewheel device 52.

The distributor 16' similar to the distributor 16 of FIGURE 1 is associated with both turbines so that the first cycle of one turbine is synchronous with the second cycle of the other, and vice versa. Similarly, a fuel pump 22' delivers fuel firstly to one turbine and then to the other turbine.

During the first cycle performed by the first turbine the speed of this turbine may slightly increase, as the differential reacts against the inertia of the other turbine. Therefore, the speed of this other turbine decreases, thus reducing the negative power absorbed by the elements revolving under no-load conditions; basically these speed variations are moderate with respect to the frequency of the cycle change; however, should a reignition not take place, the other turbine would be prevented from revolving in the reverse direction. The shaft 19" driving the fuel pump 22' and distributor 16' is driven through suitable means (not shown) from shaft 50.

I claim:

1. A gas turbine provided with a combustion chamber, a compressor and means for causing the intermittent operation of said combustion chamber and the delivery to said turbine of fresh cooling and scavenging air alternating with the flow of combustion gases delivered by said chamber and characterized in that the turbine comprises a rotary distributor provided with adjustable apertures and adapted to block by turns on the one hand the gas entrance duct to the turbine and on the other hand a branch duct communicating with the external atmosphere.

2. The gas turbine as defined by claim 1 characterized in that said distributor consists of a pair of concentric disks of which the relative angular shift permits of altering at will the ratio of said expansion and scavenging times, said angular shift being obtainable during the turbine operation through suitable mechanical means controlling at the same time the fuel injection pump.

3. Apparatus comprising two gas turbines each provided with a combustion chamber, a compressor and means for causing the intermittent operation of said combustion chamber and the delivery to said turbine of fresh cooling and scavenging air alternating with the flow of combustion gases delivered by said chamber, wherein the two turbines are associated for driving a common output shaft, said turbines having a common distributor so disposed that the expansion time of one turbine takes place during the scavenging time of the other turbine, and vice versa.

4. In a gas turbine having an intermittent combustion chamber and a compressor, a combustion air inlet feeding said combustion chamber through the compressor, a fresh cooling and scavenging air duct and a combustion gas inlet delivering respectively fresh air from the atmosphere and combustion gas from the combustion chamber at the entry of the turbine, and means for determining a cyclical sequence for delivering separately and successively said combustion gas and said fresh air to the turbine.

5. The gas turbine as defined by claim 4, including means for shifting the relative delivery durations of said combustion gas and said fresh air.

6. The gas turbine as defined by claim 4 characterized in that the turbine comprises a rotary distributor having adjustable apertures and adapted to block by turns on the one hand the gas entrance duct to the turbine and on the other hand a branch duct communicting with the external atmosphere.

7. The gas turbine as defined by claim 6 characterized in that said distributor consists of a pair of concentric disks of which the relative angular shift permits of altering at will the ratio of the expansion and scavenging times, said angular shift being obtainable during the turbine operation through suitable mechanical means controlling at the same time the fuel injection pump.

8. The gas turbine as defined by claim 4, there being two such turbines and wherein the two turbines are associated for driving a common output shaft, said turbines having a common distributor so disposed that the expansion of one turbine takes place during the scavenging time of the other turbine, and vice versa.

References Cited

UNITED STATES PATENTS

| | | | |
|---|---|---|---|
| 1,982,665 | 12/1934 | Holzwarth | 60—39.76 |
| 2,579,321 | 12/1951 | Kadenacy | 60—247 |
| 2,640,314 | 6/1953 | Abel | 60—39.76 |
| 2,659,198 | 11/1953 | Cook | 60—39.76 |

MARK M. NEWMAN, Primary Examiner

DOUGLAS HART, Assistant Examiner

U.S. Cl. X.R.

60—39.76